(12) United States Patent  
Mansri et al.

(10) Patent No.: US 9,413,240 B2  
(45) Date of Patent: Aug. 9, 2016

(54) POWER CONVERTER AND CONTROLLER DEVICE

(71) Applicants: Mohammed Mansri, Toulouse (FR); Tarek Hakam, Toulouse (FR); Alexandre Pujol, Ste Foy d'Aigrefeuille (FR)

(72) Inventors: Mohammed Mansri, Toulouse (FR); Tarek Hakam, Toulouse (FR); Alexandre Pujol, Ste Foy d'Aigrefeuille (FR)

(73) Assignee: Freescale Semiconductor, Inc., Austin, TX (US)

( * ) Notice: Subject to any disclaimer, the term of this patent is extended or adjusted under 35 U.S.C. 154(b) by 52 days.

(21) Appl. No.: 14/540,396

(22) Filed: Nov. 13, 2014

(65) Prior Publication Data

US 2015/0364996 A1    Dec. 17, 2015

(30) Foreign Application Priority Data

Jun. 13, 2014 (WO) .................. PCT/IB2014/001343

(51) Int. Cl.
*H02M 3/158* (2006.01)
*G05F 3/08* (2006.01)
*G06F 17/50* (2006.01)
*H02M 3/156* (2006.01)

(52) U.S. Cl.
CPC ................. *H02M 3/158* (2013.01); *G05F 3/08* (2013.01); *G06F 17/5072* (2013.01); *H02M 2003/1566* (2013.01)

(58) Field of Classification Search
CPC ... H02M 3/1588; H02M 3/158; H02M 3/156; H02M 2001/0009; H02M 2001/0019; H02M 3/1566; Y02B 70/1466; Y02B 20/346; G05F 1/56; G06F 17/5072
See application file for complete search history.

(56) References Cited

U.S. PATENT DOCUMENTS

| | | | |
|---|---|---|---|
| 6,975,494 B2 | 12/2005 | Tang et al. | |
| 7,495,424 B1 | 2/2009 | Mei et al. | |
| 7,583,138 B1 | 9/2009 | DeStasi et al. | |
| 8,299,770 B2 * | 10/2012 | Qiu | H02M 3/1588 323/222 |
| 8,441,242 B2 | 5/2013 | Ng et al. | |

(Continued)

FOREIGN PATENT DOCUMENTS

WO          WO9839694          9/1998

OTHER PUBLICATIONS

Zhang, Y, et al. "A Fast Transient Response Synchronous Buck Converter with Modified Ripple-Based Control (MRBC) Technique," IEEE 2013 5th Asia Symposium on Quality Electronic Design (ASQED), Aug. 26-28, 2013, pp. 14-17.

(Continued)

Primary Examiner — Adolf Berhane
Assistant Examiner — Henry Lee, III
(74) Attorney, Agent, or Firm — Charlene R. Jacobsen

(57) ABSTRACT

A switching power converter for DC-DC converting has an inductance coupled between a power output and a high side switch in a controller device. The controller device has an error amplifier coupled to the power output and a reference voltage for activating the high side switch. The controller device has a bypass circuit including a bypass switch coupled between the supply input and the power output, a bypass driver having a first input coupled to the power output and a second input coupled to the reference voltage, and an output coupled to the bypass switch for activating the bypass switch. The controller further has a high bypass current sensor for generating a transient signal based on a current via the bypass switch, and a bandwidth control circuit for increasing the bandwidth of the error amplifier based on the transient signal.

20 Claims, 5 Drawing Sheets

(56) References Cited

U.S. PATENT DOCUMENTS

| | | | |
|---|---|---|---|
| 8,461,815 B1 | 6/2013 | Ngo | |
| 8,525,502 B2 * | 9/2013 | Weinstein | H02M 1/44 323/271 |
| 8,593,125 B1 | 11/2013 | Xue | |
| 2002/0190701 A1 * | 12/2002 | Miyazaki | H02M 3/1588 323/284 |
| 2005/0035748 A1 * | 2/2005 | Inn | H02M 3/1588 323/285 |
| 2005/0179324 A1 | 8/2005 | Petricek | |
| 2008/0024101 A1 * | 1/2008 | Huang | H02M 1/143 323/282 |
| 2009/0315527 A1 * | 12/2009 | Kung | H02M 3/158 323/282 |
| 2012/0105035 A1 | 5/2012 | Lee et al. | |
| 2013/0193941 A1 * | 8/2013 | DeFazio | G05F 1/46 323/282 |

OTHER PUBLICATIONS

Lin, C. et al., "Fast Transient Technique (FTT) in Buck Current-Mode DC-DC Converters for Low-Voltage SoC Systems," IEEE Custom Integrated Circuits Conference, 2008; Sep. 21-24, 2008; pp. 25-28.

* cited by examiner

POWER CONVERTER AND CONTROLLER DEVICE

CROSS REFERENCE TO RELATED APPLICATION(S)

The present application claims priority to International Patent Application No. PCT/IB2014/001343, entitled "POWER CONVERTER AND CONTROLLER DEVICE," filed on Jun. 13, 2014, the entirety of which is herein incorporated by reference.

FIELD OF THE INVENTION

This invention relates to controller device for a power converter. The invention further relates to an integrated circuit comprising the controller device, and to a power converter comprising the controller device.

BACKGROUND OF THE INVENTION

The international patent application publication WO 98/39694 describes switch-mode power converters using an inductance coupled to the regulator output and at least a high side switch coupled between the input supply voltage and the inductance. The switch-mode regulator provides a transient response speed-up in the presence of large load transients. The speed-up is achieved by coupling a first bypass switch between the regulator output and the input voltage and a second bypass switch between the regulator output and the circuit common connection. During normal operation these bypass switches are off, but in the event of a large load transient substantially disturbing the regulator output, one of the bypass switches is momentarily turned on to couple the regulator output to the input voltage or circuit ground as appropriate to bring the regulator output within a narrow range around the nominal output voltage. Operation of the bypass switches is disabled on startup until the regulator output is within a predefined range, and whenever the regulator output exceeds a limit range indicative of a fault condition.

A drawback of such regulators is that due to large load transients the deviation of the actual output from the required output voltage is relatively large.

SUMMARY OF THE INVENTION

The present invention provides a controller device, and integrated circuit and a power converter as further described in the accompanying claims.

Specific embodiments of the invention are set forth in the dependent claims. Aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

Elements in the figures are illustrated for simplicity and clarity and have not necessarily been drawn to scale. In the figures, elements which correspond to elements already described may have the same reference numerals.

DETAILED DESCRIPTION OF THE PREFERRED EMBODIMENTS

As such, switching power converters (also called buck converters or buck regulators) for converting a DC input voltage to a different, lower, DC output voltage are well known. To have limited dissipation and good power efficiency a buck regulator is often used to step down a high level unregulated input voltage to a regulated, lower, output voltage. Fast transient response is a common requirement for DC-DC converters, especially for applications which require a low output voltage, e.g. about 1 V, and a small tolerance, e.g. 50 mV. Known regulators may have a slow transient response which is not suitable for many of today's applications.

Figure 1:
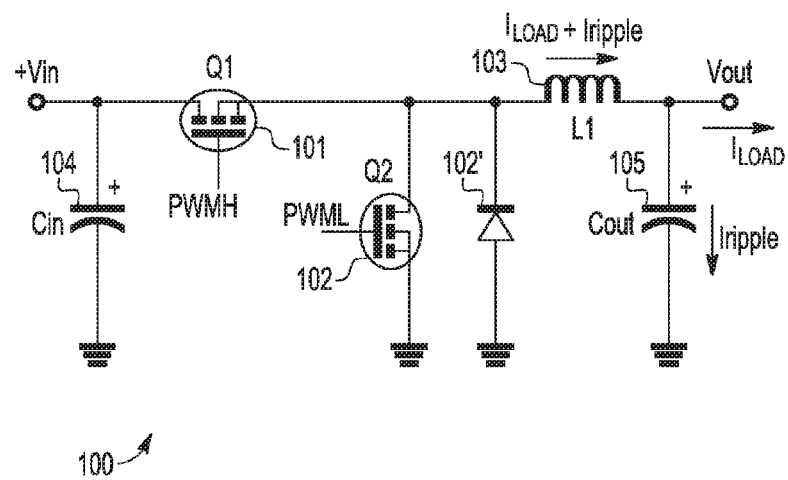
FIG. 1 shows an example of a prior art power converter.

FIG. 1 shows an example of a prior art power converter. The power converter 100 has an supply voltage input +Vin and a power output Vout. An inductance 103 is connected between the power output and a high side switch 101, e.g. a MOSFET transistor Q1, which is connected to the supply voltage input. The supply voltage input may be connected to a battery and may be provided with an input capacitor Cin 104 to filter noise. The power output is provided with an output capacitor Cout 105. The inductance is further connected to the power output and a low side switch 102, e.g. a MOSFET transistor Q2, and/or a passive low side switch 102', e.g. a diode. The power converter is arranged to deliver a current $I_{load}$ to a load connected to the power output. The high side switch is controlled by a pulsed control signal, e.g. a pulse width modulated high control signal PWMH. The active low side switch is controlled by a complementary pulsed signal, e.g. a pulse width modulated low control signal PWML. The pulsed control signals are generated to cause a total current via the inductance $I_{load}$ and $I_{ripple}$ The power converter 100 may be called a traditional buck converter, or asynchronous buck converter.

The transient response of the traditional buck voltage regulator may be limited by its passive filter, for example inductance 103 and output capacitor 105 in the above circuit. The passive filter may cause transient limitation due to the value of the inductor and the value of the capacitor, and the equivalent series resistance (esr) on its output.

Some known measures provide fast transient load regulation for traditional buck converter by using a huge output capacitor with low equivalent series resistance. However this measure is not acceptable for low cost or small size products. Also the switching frequency may be made very high, which however may not be acceptable due to the EMC conducted emission and/or low power efficiency. Increasing the switching frequency and decreasing the inductance value may cause a small duty cycle (i.e. a very small switching on time $T_{ON}$).

A further known system may be to have multiple buck convertors in parallel. Also, in addition to the high side switch, a bypass switch may be provided, for example as described in the international patent application WO98/39694 described above. However, such systems may not provide a suitable control of the output voltage.

In the current system at least one bypass device is used in parallel with the main voltage regulator. During a fast load change, the bypass device pushes additional current to the load. The output voltage is controlled to be at a required voltage via a main control loop that controls the output voltage to be at a required value by appropriately switching of the high side switch. The bandwidth of the control loop is increased to accelerate the recovery time of the main regulator for load transients, as described below in detail.

Figure 2:
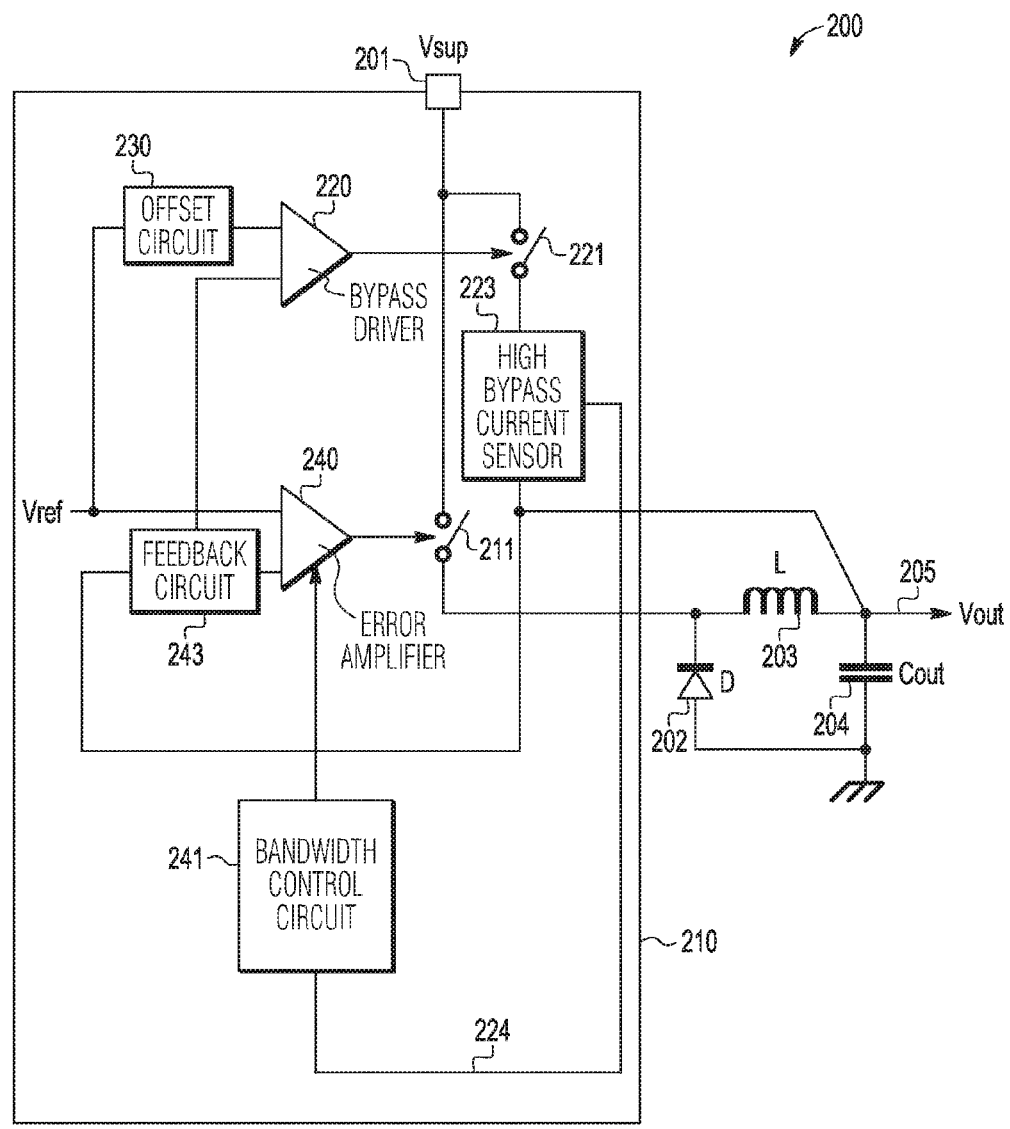
FIG. 2 shows an example of an embodiment of a power converter having bandwidth control.

FIG. 2 shows an example of an embodiment of a power converter having bandwidth control. The power converter 200 has a controller device 210 for converting an input voltage into an output voltage. The converter has an inductance 203 having an output side coupled to a power output 205 of the power converter and a switched side coupled to a high side switch 211. The high side switch may be a MOSFET transistor. The power output may be provided with a capacitor Cout 204. A diode 202 may be connected between the switched side of the inductance and ground. The controller device has a negative supply or ground terminal (not shown). Typical values for the inductance and output capacitor may be L=22 uH and Cout=20 uF, but other values may be used depending on the desired converter characteristics.

The controller device 210 has a buck circuit for providing a switched mode control. The buck circuit includes the high side switch 211 coupled to a supply input 201 and the power output 205, and a feedback circuit 243 also coupled to the power output. The high side switch is controlled by a switching control circuit comprising an error amplifier 240 for providing pulsed control signals. The error amplifier has a first input coupled to a reference voltage Vref, and a second input for receiving a feedback signal via a feedback circuit 243. Hence the error signal on inputs of the error amplifier represents a difference of the power output and the reference voltage, a high value of the feedback signal. The buck circuit constitutes a control loop that generates a duty cycle of the pulsed control signals according to pulse width control or pulse frequency control.

The controller device 210 further has a bypass circuit. The bypass circuit has a high bypass switch 221 coupled between the supply input 201 and the power output 205. The high bypass switch may be a further MOSFET transistor. The bypass circuit further has a bypass driver 220 having a first bypass driver input coupled to the power output via the feedback circuit 243 and a second bypass driver input coupled to the reference voltage, and a bypass driver output coupled to the bypass switch 221 for activating the bypass switch based on a second difference of the power output and the reference voltage. The feedback circuit 243 may include an offset circuit to provide an offset such that the second difference is larger than the first difference. Alternatively, or additionally, the reference voltage Vref may be coupled via a separate offset circuit 230 to provide the offset. The offset is provided for activating the high bypass switch only if the output voltage drops below a predetermined boundary value due to a sudden load change, further called a transient.

The bypass circuit provides transient response speed-up in the presence of large load transients. The speed-up is achieved by coupling a first MOSFET bypass switch between the regulator output and the input voltage. Optionally a second MOSFET bypass switch is added between the regulator output and the circuit common connection. During normal operation the bypass is off, but in the event of a large load transient substantially disturbing the regulator output, a respective one of the bypass switches is temporarily turned on to couple the regulator output to the input voltage, or circuit ground, as appropriate to bring the regulator output within a narrow range around the nominal output voltage. Effectively there is a fast secondary loop in parallel with a classical buck converter, which may be synchronous or asynchronous. The high side bypass switch is coupled to the output to push current to the load during a positive fast load step. The low side bypass switch is coupled to the output to pull current from inductor during a negative fast load step.

The high side bypass circuit further has a high bypass current sensor 223 for generating a transient signal 224 based on a current via the bypass switch. The transient signal may be a digital signal having a true value if the current via the bypass switch exceeds a predetermined limit. Alternatively, the transient signal may be a logical value or analog signal that represents the amount of current flowing via the bypass switch.

The error amplifier circuit has a bandwidth control circuit 241 for controlling the bandwidth of the control loop based on the transient signal. The control loop is formed by the output voltage being coupled via the feedback circuit 243 to the error amplifier 240, which controls the high side switch 211. The bandwidth control circuit has a compensation circuit that includes frequency dependent components that are switched or set to modify the frequency response of the error amplifier, for example a frequency dependent feedback loop having switchable capacitors.

Figure 3:
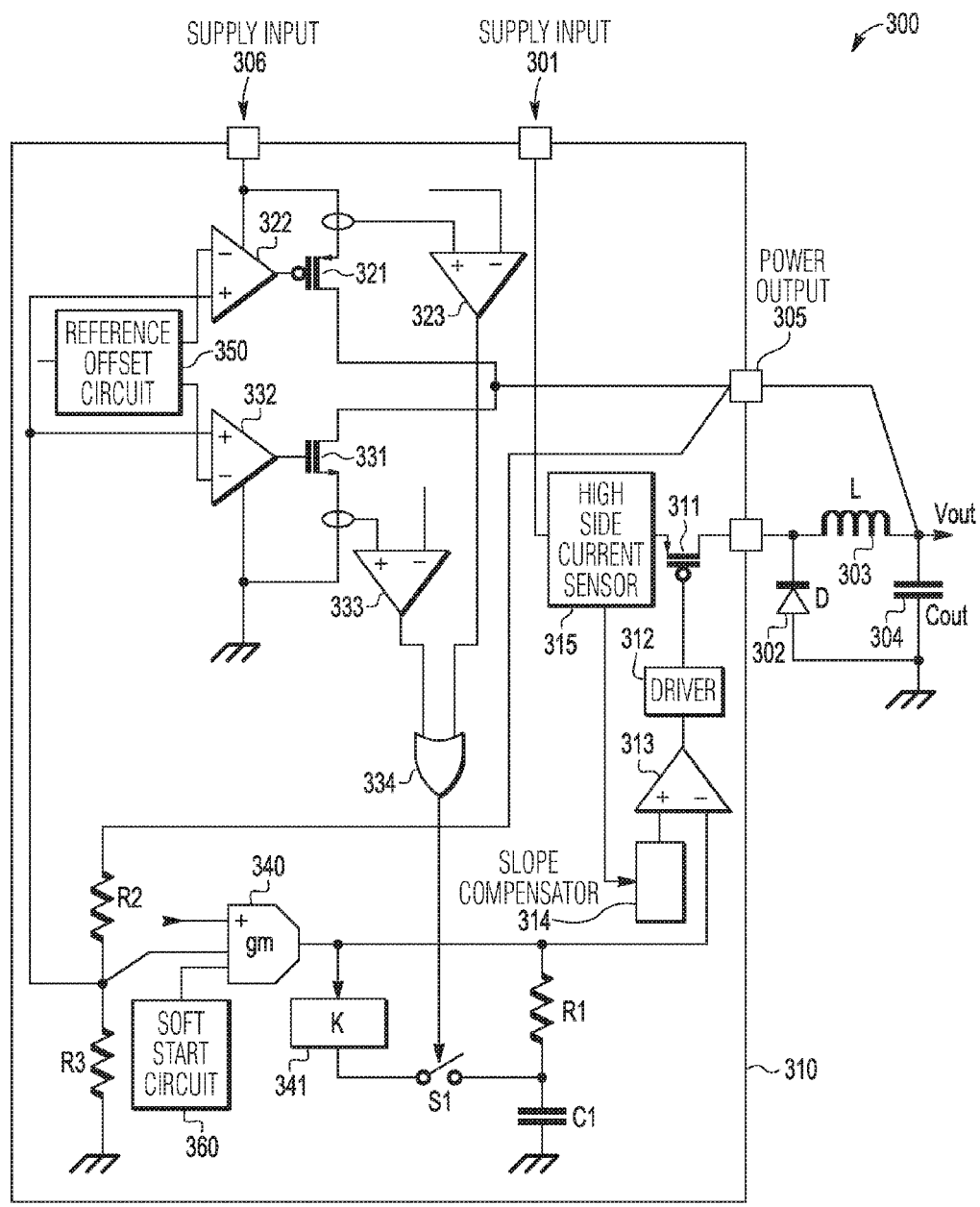
FIG. 3 shows an example of a further embodiment of a power converter having bandwidth control.

FIG. 3 shows an example of a further embodiment of a power converter having bandwidth control. The power converter 300 has a controller device 310 for converting an input voltage into an output voltage. The converter has an inductance 303 having an output side coupled to a power output 305 of the power converter and a switched side coupled to a high side MOSFEET switch 311. The power output may be provided with a capacitor Cout 304. A diode 302 may be connected between the switched side of the inductance and ground for providing a low side switch.

The controller device 310 has a buck circuit for providing a switched mode control. The buck circuit has the high side switch 311 further coupled to a supply input 301. The power switch is controlled by a switching control circuit comprising, for example, a driver 312, a control amplifier 313 and a slope compensator 314 connected to a first input of the control amplifier. The slope compensator may have a sense input coupled to a high side current sensor 315 for sensing a current via the high side switch 311. The sensed current is compared to the output of the error amplifier 340. The switching control circuit provides pulsed control signals. The control amplifier has a second input for receiving a feedback signal that is based on a difference of the power output and a reference voltage, a high value of the feedback signal causing a duty cycle of the pulsed control signals according to pulse width control or pulse frequency control.

The buck circuit further has an error amplifier circuit including an error amplifier 340. The error amplifier circuit has a first error input coupled to the power output via a feedback circuit and a second error input coupled to a reference voltage, and an error output coupled to the high side switch via the switching control circuit for activating the high side switch based on a first difference of the power output and the reference voltage. The output voltage is coupled to the feedback circuit, e.g. a voltage divider comprising a first feedback resistor R2 in series with a second feedback resistor R3, the output of the feedback circuit being coupled to the input of error amplifier 340 having a second input coupled to the reference voltage for amplifying said difference. The output of the error amplifier may be coupled to a second input of the control amplifier 313. Thereby the output voltage of the power converter is controlled to a predefined value proportional to the feedback resistors. The buck circuit constitutes a traditional bucket regulator control circuit known as such, and may be arranged in various other ways, well known as such.

The controller device 310 further has a bypass circuit. The bypass circuit at least has a high side bypass circuit, which includes a high bypass switch 321 which may be coupled between a further supply input 306 and the power output 305. The further supply input 302 may be combined with the main supply input 301. Alternatively, a separate main voltage Vsup1 on the main supply input 301 and a secondary supply voltage Vsup2 on secondary supply input 306 may be used. Now Vsup1 may be substantially higher than Vout and Vsup2 may be connected to another power supply and be lower than Vsup1, which enables reducing the die size and using low voltage devices in the part of the circuit coupled to the secondary supply input.

The high side bypass circuit further has a high bypass driver 322 having a first bypass driver input coupled to the power output via the feedback circuit and a second bypass driver input coupled to the reference voltage, and a bypass driver output coupled to the bypass switch 321 for activating the bypass switch based on a second difference of the power output and the reference voltage. The feedback circuit, or the reference voltage on the second bypass driver input, may be arranged to provide an offset such that the second difference is larger than the first difference. The high side bypass circuit further has a high bypass current sensor 323 for generating a transient signal based on a current via the bypass switch.

The error amplifier circuit has a bandwidth control circuit for controlling the bandwidth of the control loop based on the transient signal. In the example shown in the Figure, the error amplifier has a transconductance output coupled to a bandwidth impedance. The bandwidth control circuit is arranged for increasing the bandwidth by modifying the bandwidth impedance via a bandwidth switch S1. The bandwidth impedance includes a capacitor C1 in series with a resistor R1 coupled to the transconductance output. The bandwidth control circuit further has a gain unit 341 having a gain K. The gain unit has an input coupled to the transconductance output and an output coupled to the capacitor via the bandwidth switch S1. The bandwidth switch, for example a MOSFET, is controlled based on the transient signal.

In an embodiment the high bypass current sensor 323 is arranged for generating the transient signal when the current via the bypass switch exceeds a predetermined current limit. The limit value may be a predefined limit value, or a changeable value that is set, for example, based on characteristics of the load, an environmental condition like temperature, etc.

In an embodiment the high bypass current sensor 323 may have a first input coupled to a current sensing element for detecting the current via the bypass switch and a second input coupled to a reference value representing the predetermined current limit. The current sensing element may, for example, be a resistor is series with the bypass switch.

In an embodiment the bypass circuit further includes a low bypass circuit. The low bypass circuit has a low bypass switch 331 coupled between a negative supply or ground supply and the power output 305. The low bypass circuit further has a low bypass driver 332 having a first bypass driver input coupled to the power output via the feedback circuit and a second bypass driver input coupled to the reference voltage, and a bypass driver output coupled to the low bypass switch 331 for activating the low bypass switch based on a third difference of the power output and the reference voltage. The feedback circuit, or the reference voltage on the second bypass driver input, may be arranged to provide an offset such that the third difference is larger than the first difference. The low bypass circuit further has a low bypass current sensor 333 for generating a low transient signal based on a current via the low bypass switch. The low transient signal may be combined by a combiner 334, for example an OR gate, to generate a combined transient signal for adapting the bandwidth when either one of the bypass switches is activated and carries bypass current. For example, the low bypass switch may be a MOSFET transistor.

The operation of the circuit for adapting the bandwidth is as follows. The current of the high bypass switch HSsw2, called I_HSsw2 is sensed, and compared to a high boundary value Iref_hs. Similarly, the current of low bypass switch LSsw2 (I_LSsw2 may be sensed and compared to a low boundary value Iref_ls. If I_HSsw2 is higher than Iref_hs or I_LSsw2 is higher than Iref_ls the transient signal, called fast_trans, is set to high else the signal is reset to low. The signals in the circuit are further named as follows:

Vref is the voltage reference of the buck converter main loop;

Vref_hs is the reference voltage on the second input of the high bypass driver 322 called Driver_HSsw2, and Vref_hs is lower than Vref;

Vref_ls is the reference voltage on the second input of the low bypass driver 332 called Driver_LSsw2, and Vref_ls is higher than Vref.

The transient signal controls bandwidth switch S1, as follows:

If fast_trans='0' S1 is OFF else if fast_trans='1' S1 is ON.

When S1 is ON the gain bandwidth of the error amplifier control loop is increased.

During normal operation of the power converter, so called steady state, the feedback voltage Vfb is equal to the reference voltage Vref. Since Vref_hs is lower than Vref and Vref_ls is higher than Vref. Driver_HSsw2 turns off HSsw2 and Driver_LSsw2 turns off LSsw2, and the transient signal Fast_trans is set to low.

During a positive fast load step the output voltage drops, and one of three cases may occur.

Case 1: Vfb is higher than Vref_hs it means that the step is not huge. Only the high side switch of the buck circuit continues to provide the current.

Case 2: Vfb drops under Vref_hs and the driver drives HSsw2 to keep the Vfb equal to Vref_hs. If I_HSsw2 is lower than Iref_hs the compensation of the buck converter is unchanged. The main loop increases the current inside the inductance until Vfb reachs Vref. HSsw2 is turned OFF when Vfb becomes higher than Vref_hs.

Case 3: Vfb drops under Vref_hs the driver drives HSsw2 to keep the Vfb equal to Vref_hs. I_HSsw2 is higher than Iref_hs so the flag fast_trans is set to high and the gain bandwidth of the buck converter is increased. The main loop increases the current inside the inductance. Fast_trans will be set to low when I_HSsw2 becomes lower than Iref_hs. HSsw2 is turned OFF when Vfb becomes higher than Vref_hs.

During a negative fast load step the output voltage increases, as the energy of the inductor is higher than the energy needed by the load, and one of the following three cases may occur.

Case 1: Vfb is lower than Vref_ls it means that the step is not huge. Only the main loop continues to provide the current.

Case 2: Vfb becomes higher than Vref_ls, the driver drives LSsw2 to keep the Vfb equal to Vref_ls. I_LSsw2 is lower than Iref_ls the compensation of the buck converter is unchanged.

Case 3: Vfb becomes higher than Vref_ls, the driver turns on LSsw2 to keep the Vfb equal to Vref_ls. I_LSsw2 is higher than Iref_ls the transient signal fast_trans is set to high and the gain bandwidth of the buck converter is increased. The main loop decreases the current inside the inductance. Fast_trans will be set to low when I_LSsw2 becomes lower than Iref_ls. LSsw2 is turned OFF when Vfb becomes lower than Vref_ls.

The effect of the bandwidth control can be expressed in a formula as follows. In the formula, the error amplifier has a transconductance gain $g_m$, the capacitor has a capacity C1 and the resistor has a resistance R1. The input voltage between the first error input and the second error input is called $V_{in\_compensation}$ and the output voltage on the transconductance output is called $V_{out\_compensation}$. When the transient signal is not active the bandwidth control is defined by:

$$\frac{V_{out\_compensation}}{V_{in\_compensation}} = gm * \left(R1 + \frac{1}{p*C1}\right) \quad (1)$$

When the transient signal is active the bandwidth control is defined by:

$$\frac{V_{out\_compensation}}{V_{in\_compensation}} = gm * \left(R1 + \frac{1}{p*C1/(K+1)}\right) \quad (2)$$

In an embodiment the controller device may further have a reference offset circuit 350 for generating an offset of the second bypass driver input with respect to the reference voltage for defining the second difference. The offset circuit may be coupled to the reference voltage that is also on the second input of the error amplifier 340 so that a high offset reference voltage is generated on the first bypass driver input. Similarly, a low offset reference voltage may be generated on the first input of the low bypass driver 332. The other input of the respective bypass driver is directly coupled to the feedback circuit (as shown).

Figure 4:
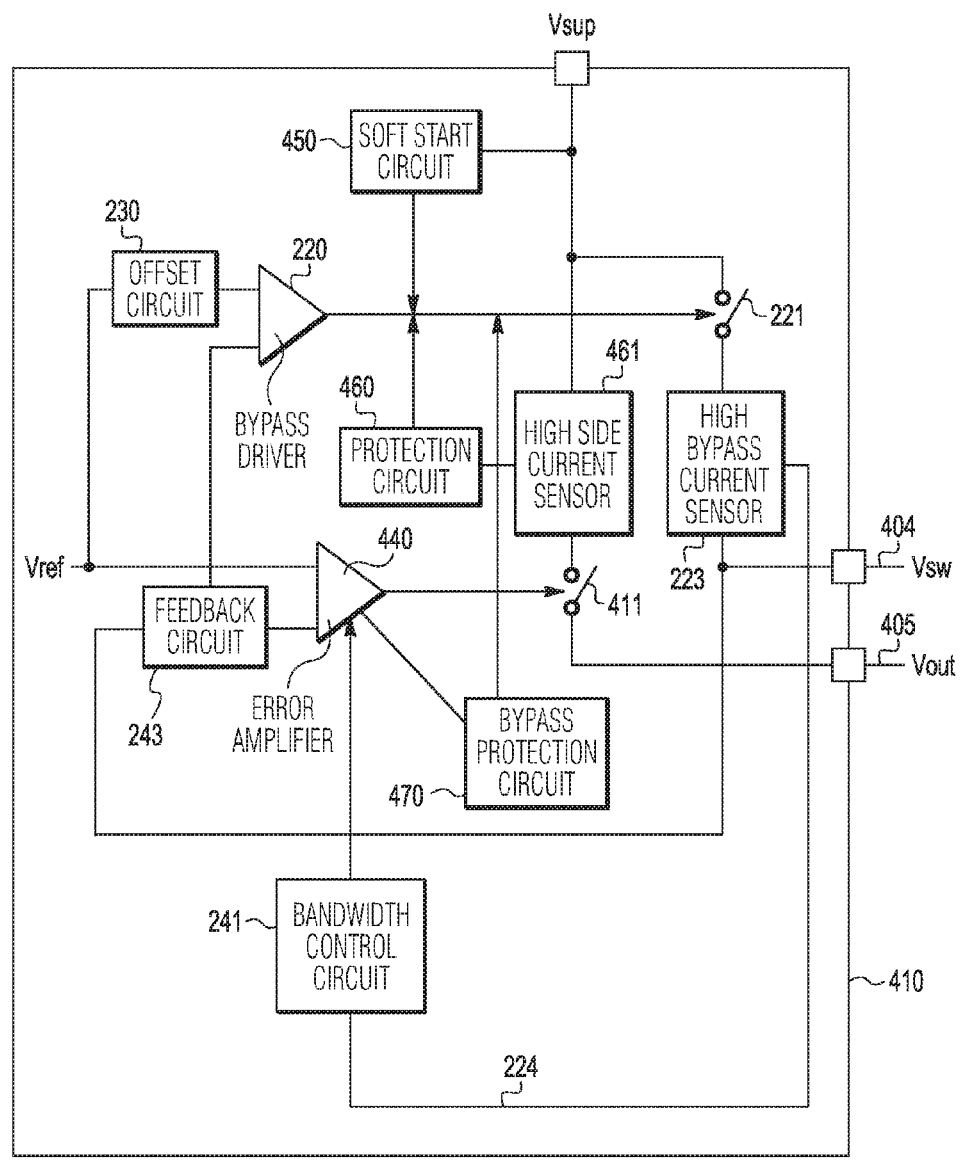
FIG. 4 shows an example of an embodiment of a controller device having bandwidth control.

In an embodiment the controller device may have an offset circuit for generating a high offset of the input of the first bypass driver 322 with respect to the power output for defining the second difference. Similarly, a low offset low voltage may be generated on the first input of the low bypass driver 332. The other input of the respective bypass driver is directly coupled to the reference voltage. The offset circuit may be coupled to the feedback circuit, or combined with the feedback circuit, to generate a feedback voltage that is offset from the feedback voltage on the error amplifier input, FIG. 4 shows an example of an embodiment of a controller device having bandwidth control. The controller device 410 is arranged similar to the controller device 210 as described with reference to FIG. 2 or the controller device 310 as described with reference to FIG. 3, but has one or more further circuits controlling the bypass switch. The controller device has a switch output 404 for outputting a switch voltage Vsw to be coupled to one side of an inductance as described above, and a power output 405 for providing the output voltage Vout to be further coupled to the other side of the inductance.

In an embodiment the controller device may further have a soft start circuit 450 arranged to limit the inrush current during power up. During the soft start the high bypass switch is turned off. The soft start circuit is coupled to the supply power input 201 and may detect power up events and/or power down events. Upon detection the bypass switch may be blocked, i.e. forced to be open, for example for a predetermined period until a steady state of the power converter is reached. Alternatively, or additionally, the soft start circuit may be arranged to always block the bypass switch until detecting that a steady state of the power converter is reached. Similarly, in the circuit according to FIG. 3, a soft start circuit 360 may be added and may be coupled to a further input of the error amplifier 340 for gradually increasing the output voltage.

In an embodiment the controller device may further have a protection circuit 460 arranged for turning off the high bypass switch when the current via the high side switch 411 exceeds a predetermined protection limit. The protection circuit may be coupled to a high side current sensor 461 for detecting the current via the high side switch. The protection enables reducing the die size of the bypass switch. Similarly, in FIG. 3 a protection circuit may be added and coupled to high side current sensor 315 for turning off the high side switch 311.

Optionally, the protection circuit may further have a timer for turning off the high bypass switch when the current via the high side switch exceeds a predetermined protection limit for a predetermined period. So only when the high side current remains too high for a prolonged period exceeding the predetermined period as counted by said timer, the bypass switch is opened.

In an embodiment the controller device may further have a bypass protection circuit 470 arranged for turning off the high bypass switch when the first difference exceeds a predetermined high feedback limit. Thereto the bypass protection circuit may be coupled to an error amplifier 440 that has an output to provide such a detection signal based exceeding on the high feedback limit. Alternatively, the bypass protection circuit may be coupled to the feedback circuit 243 and the reference voltage to provide such a detection signal.

In an embodiment the controller device may further have a low bypass protection circuit (not shown) arranged for turning off the low bypass switch when the first difference exceeds a predetermined low feedback limit. The low bypass protection circuit is equal to the bypass protection circuit 470, or may be combined with the bypass protection circuit to block both the high bypass switch and the low bypass switch.

In an embodiment the controller device may further have a low protection circuit (not shown) arranged for turning off the low bypass switch when the current via the low side switch exceeds a predetermined low protection limit. The low protection circuit is equal to the protection circuit 460, or may be combined with the protection circuit 460 to block both the high bypass switch and the low bypass switch. Optionally, the low protection circuit may further have a low timer for turning off the low bypass switch when the current via the low side switch exceeds a predetermined low protection limit for a predetermined low period. The low protection enables reducing the die size of the low bypass switch.

Figure 5A:
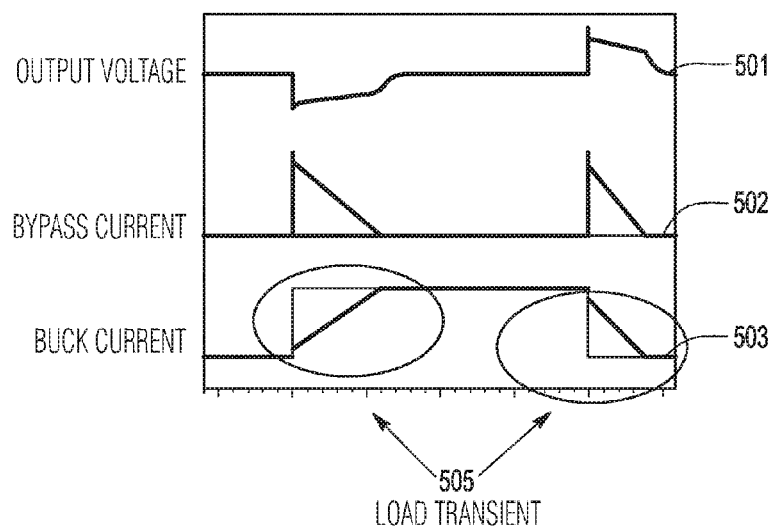
FIG. 5a shows an example of a response of a prior art power converter on load transients.

FIG. 5a shows an example of a response of a prior art power converter on load transients.

In FIG. 5a, an upper signal 501 represents the output voltage, a middle signal 502 represents the bypass current, and a lower signal 503 represents the buck current via the inductance. The signals represent an example of signals of a traditional converter having bypass switches. The response of the buck current 503 is compared to the block shaped load transient as indicated in circles 505.

Figure 5B:
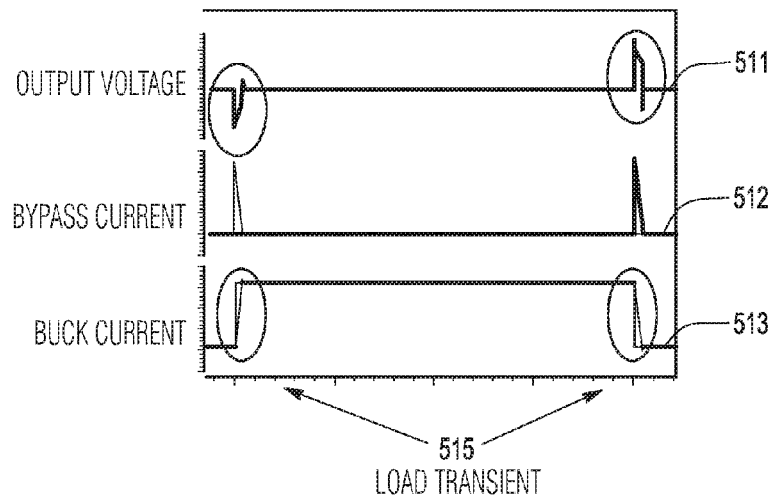
FIG. 5b shows an example of a response of a power converter having bandwidth control on load transients.

FIG. 5b shows an example of a response of a power converter having bandwidth control on load transients. In FIG. 5b, an upper signal 511 represents the output voltage, a middle signal 512 represents the bypass current, and a lower signal 513 represents the buck current via the inductance. The signals represent an example of signals of the proposed converter having bypass switches and having bandwidth control during transients. The response of the buck current 513 is compared to the block shaped load transient as indicated in circles 515.

The signals in FIGS. 5a and 5b are on equal horizontal time scale, and vertical voltage scale. When comparing FIGS. 5a and 5b it is clear that the buck current 513 of the proposed converter is more quickly adapted to the load transient, than the traditional buck current 503. The output power only deviates for a short period from the required nominal voltage. The buck current in the traditional converter is slowly adapted to the new load, causing a prolonged deviation of the output voltage.

The example signals show that the bandwidth control reduces the recovery time. So the power dissipation may be lower and the efficiency may be higher.

In the foregoing specification, the invention has been described with reference to specific examples of embodiments of the invention. It will, however, be evident that various modifications and changes may be made therein without departing from the broader spirit of the invention as set forth in the appended claims. For example, the connections may be a type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Furthermore, the units and circuits may be suitably combined in one or more semiconductor devices.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. Controller device for a power converter,
   the converter being arranged for converting an input voltage into an output voltage and comprising an inductance coupled between a power output of the power converter and a high side switch,
   the controller device comprising
   the high side switch further coupled to a supply input of the power converter,
   a control loop for controlling the output voltage comprising an error amplifier having a first error input coupled to the power output and a second error input coupled to a reference voltage, and an error output coupled to the high side switch for activating the high side switch based on a first difference of the power output and the reference voltage,
   a high bypass switch coupled between the supply input and the power output,
   a high bypass driver having a first bypass driver input coupled to the power output, a second bypass driver input coupled to the reference voltage and a bypass driver output coupled to the high bypass switch for activating the high bypass switch based on a second difference of the power output and the reference voltage, the second difference being larger than the first difference,
   a high bypass current sensor for generating a transient signal based upon detecting a current via the high bypass switch,
   the control loop having a bandwidth control circuit for increasing a bandwidth of the control loop based on the transient signal.

2. Device as claimed in claim 1, the error amplifier having a bandwidth control input coupled to the bandwidth control circuit for controlling the bandwidth of the error amplifier.

3. Device as claimed in claim 1, the error amplifier having a transconductance output coupled to a bandwidth impedance in the control loop, and the bandwidth control circuit being arranged for controlling the bandwidth by modifying the bandwidth impedance.

4. Device as claimed in claim 3, the bandwidth impedance comprising a capacitor in series with a resistor coupled to the transconductance output, and the bandwidth control circuit further comprising a gain unit having an input coupled to the transconductance output and an output coupled to the capacitor via a bandwidth switch, the bandwidth switch being controlled by the transient signal.

5. Device as claimed in claim 4, the error amplifier having a transconductance gain $g_m$ and the gain unit having gain K, the capacitor having a capacity C1 and the resistor having a resistance R1, an input voltage between the first error input and the second error input being $V_{in\_compensation}$ and an output voltage on the transconductance output being $V_{out\_compensation}$ when the transient signal is not generated the bandwidth being defined by:

$$\frac{V_{out\_compensation}}{V_{in\_compensation}} = gm * \left(R1 + \frac{1}{p*C1}\right)$$

and when the transient signal is generated the bandwidth being defined by:

$$\frac{V_{out\_compensation}}{V_{in\_compensation}} = gm * \left(R1 + \frac{1}{p*C1/(K+1)}\right).$$

6. Device as claimed in claim 1, the high bypass current sensor being arranged for generating the transient signal when the current via the bypass switch exceeds a predetermined current limit.

7. Device as claimed in claim 6, the high bypass current sensor comprising a first input coupled to a current sensing element for detecting the current via the bypass switch and a second input coupled to a reference value representing the predetermined current limit.

8. Device as claimed in claim 1, further comprising an offset circuit for generating an offset of the first bypass driver input with respect to the power output for defining the second difference.

9. Device as claimed in claim 1, further comprising a reference offset circuit for generating an offset of the second bypass driver input with respect to the reference voltage for defining the second difference.

10. Device as claimed in claim 1, further comprising a low bypass switch coupled between the low supply input and the power output,
    a low bypass driver having a first low bypass driver input coupled to the power output and a second low bypass driver input coupled to the reference voltage, and a low bypass driver output coupled to the low bypass switch for activating the low bypass switch based on a third difference of the power output and the reference voltage, the third difference being larger than the first difference,
    a low bypass current sensor for further generating the transient signal based on a current via the low bypass switch.

11. Device as claimed in claim 1, the high side switch being a MOSFET transistor.

12. Device as claimed in claim 1, the bypass switch being a first MOSFET transistor, and where depending on claim 10, the low bypass switch being a second MOSFET transistor.

13. Device as claimed in claim 1, further comprising a soft start circuit arranged for turning off the high bypass switch when the input voltage is switched on until a steady state of the power converter is reached.

14. Device as claimed in claim 1, further comprising a protection circuit arranged for turning off the high bypass switch when the current via the bypass switch exceeds a predetermined protection limit.

15. Device as claimed in claim 14, the protection circuit further comprising a timer for turning off the high bypass switch when the current via the bypass switch exceeds a predetermined protection limit for a predetermined period.

16. Device as claimed in claim 1, further comprising a low protection circuit arranged for turning off the low bypass switch when the current via the low bypass switch exceeds a predetermined low protection limit.

17. Device as claimed in claim 1, further comprising a bypass protection circuit arranged for turning off the high bypass switch when the first difference exceeds a predetermined high feedback limit.

18. Device as claimed in claim 1, further comprising a low bypass protection circuit arranged for turning off the low bypass switch when the first difference exceeds a predetermined low feedback limit.

19. An integrated circuit comprising at least one controller device according to claim 1.

20. A power converter for converting an input voltage into an output voltage, the power converter comprising a controller device as claimed in claim 1, and an inductance coupled between a power output of the power converter and the high side switch in the controller device.

* * * * *